(No Model.)  2 Sheets—Sheet 1.
E. THOMSON.
ELECTRIC MEASURING INSTRUMENT.
No. 511,376. Patented Dec. 26, 1893.
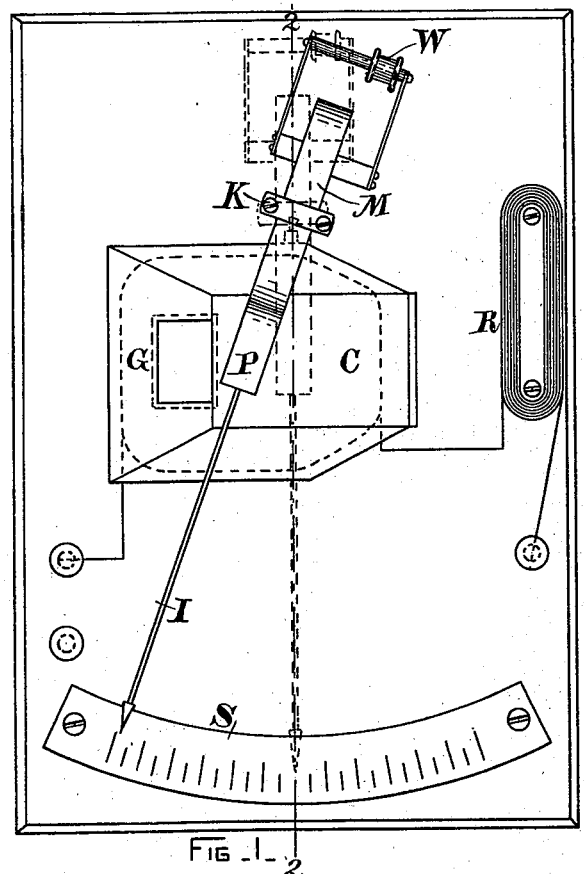
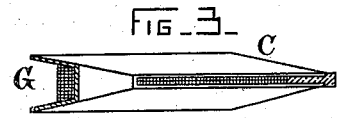
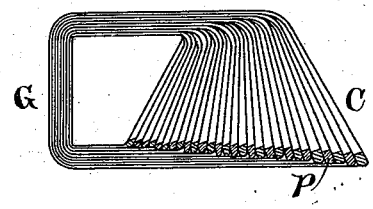
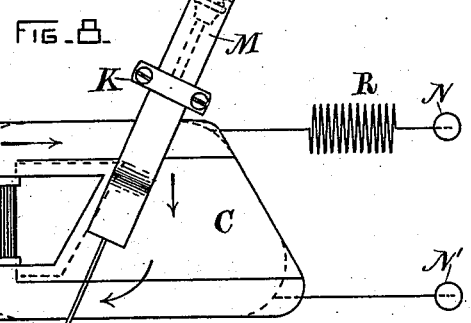
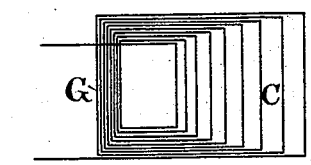
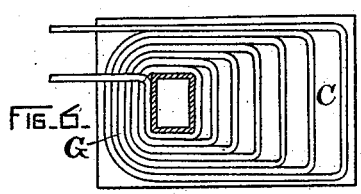
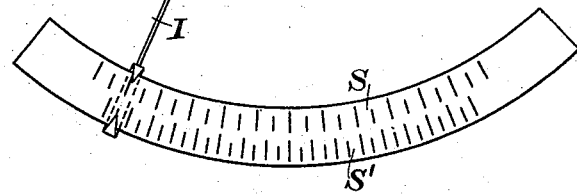
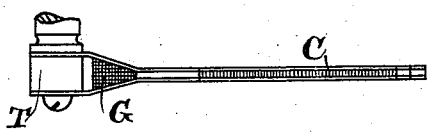
WITNESSES
Alec F. Macdonald
T. J. Johnston.
INVENTOR
Elihu Thomson
by Bentley and Blodgett
Att'ys.

(No Model.) 2 Sheets—Sheet 2.

E. THOMSON.
ELECTRIC MEASURING INSTRUMENT.

No. 511,376. Patented Dec. 26, 1893.

WITNESSES—
Alec F Macdonald.
T J Johnston.

INVENTOR—
Elihu Thomson by
Bentley and Blodgett,
Attys.

UNITED STATES PATENT OFFICE.

ELIHU THOMSON, OF SWAMPSCOTT, ASSIGNOR TO THE GENERAL ELECTRIC COMPANY, OF BOSTON, MASSACHUSETTS.

ELECTRIC MEASURING-INSTRUMENT.

SPECIFICATION forming part of Letters Patent No. 511,376, dated December 26, 1893.

Application filed March 2, 1893. Serial No. 464,398. (No model.)

*To all whom it may concern:*

Be it known that I, ELIHU THOMSON, of Swampscott, county of Essex, and State of Massachusetts, have invented certain new and useful Improvements in Electric Measuring-Instruments, (the construction preferred providing a simple ammeter and voltmeter from which indications are obtained definitely and by what is known as "dead-beat" movement—that is the index moves positively and without continued vibration,) of which the following is a specification.

A further object which I have in view is to provide a complete voltmeter or ammeter, which by a change in its connections readily made by a single switch, may be made to register either volts or ampères; and which is further provided with a double scale by which its indications may be read in the desired unit. To these ends I provide an oscillating horse-shoe magnet balanced upon suitable pivots and having its poles closely approximated; between these poles I arrange a conductor of copper or other good conducting metal wound into a coil of a shape to be described hereinafter, in the case of a voltmeter of many turns of fine wire, and in that of an ammeter of fewer turns and coarser wire. I prefer to wind this upon a bobbin, which may sometimes itself be provided with terminals, by which it may be traversed by a current to be measured, in which case I provide also a second set of terminals for the coil. Instead of this I may provide the bobbin with two windings, one of heavy wire and few turns adapted to current measurements and the other adapted, as before described, to potential; and in such case the two sets of terminals are connected respectively to the coil of coarse wire and to that of finer wire.

In the accompanying drawings, hereby referred to and made part of this specification, and which show an embodiment of my invention, like letters refer to like parts, and therein—

Figure 2:
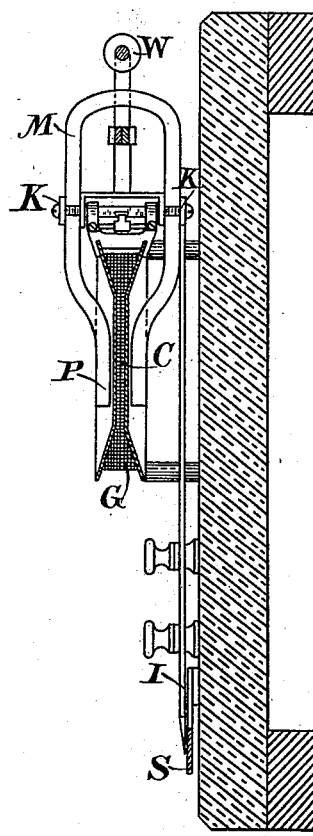
Figure 7:
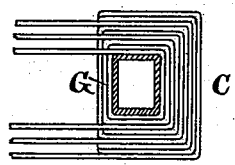

Figure 1, is a front elevation of a voltmeter or ammeter such as is described herein. Fig. 2 is a side elevation partly in section, the section being taken upon the line 2 2 of Fig. 1, looking to the left. Fig. 3 is a sectional elevation of the bobbin having a coil wound upon it. Fig. 4 is a modified form of winding. Figs. 5, 6, and 7 show modified windings, in Fig. 7 the winding being shown in multiple. Fig. 8 is a modification and Fig. 9 is a section of the bobbin used in Fig. 8.

Referring by letter, M is a horse-shoe magnet, simple or compound, having its poles P closely approximated, as more fully illustrated in Fig. 2; attached to the magnet is an index I reciprocating over the scale S, which may be suitably divided. Embracing the sides or legs of the magnet M are clamps K K, serving to support a knife-edge pivot of a well known construction, which rests in a projection shown raised from the bobbin. As illustrated by Fig. 2, a small thrust-check is introduced into the knife-edge pivot to prevent its longitudinal movement, thus also preventing the contact of the magnet poles with the bobbin. The upper part of the magnet is provided with a counterpoise W, by the adjustment of which the center of gravity of the magnet may be altered and the zero point of the needle index I may be varied; in the illustration the center of gravity of the magnet is slightly below the support or knife-edge, and it therefore hangs in the position shown. It is manifest, however, that by adjusting the magnet in the clamps the same effect may be obtained without the use of the counterpoise W; but this is a less ready method than the other and does not admit of so delicate an adjustment.

As is shown best in Fig. 2, the poles of the magnet are closely approximated for a short space to the bobbin; the object of this being to increase the strength and permanence of its magnetic field and at the same time to increase the effect of the coil upon the magnet. The bobbin or the coil is wound of the shape shown in Figs. 2 and 3, wherein G is a broad portion, while C is a narrow and thin portion; the object of making the part C narrow and thin is to allow it to pass between the poles of the magnet as shown in Fig. 2, while bunching the winding as shown at G affords a convenient, though not necessary means of making the coil less bulky. Fig. 4 illustrates another means of accomplishing the same end. In this figure, in order to attain the fan shape illustrated at C, small strips of wood or filling are introduced between the wires, and are designated by *p*.

For measuring potential it is necessary, as is well understood in the art, to have a fine wire of many turns in the coil and in some cases of very high potential, it is best to introduce a determinate resistance (indicated by R in Fig. 1) which is taken into account in the calibration of the scale. In case the measuring instrument is to be wound for current a coarser winding with fewer turns of wire is necessary; and in this case that part of the winding corresponding to C will generally be composed of a single layer or thickness of wire; to facilitate such a winding illustrations Figs. 5, 6, and 7 are shown, Fig. 5 being open winding of the kind just described, Fig. 6 being a still coarser winding and Fig. 7 showing such a winding where three wires are wound upon the bobbin and may be used either in series or multiple.

Where the resistance R is used, made up of a coil or coils, it is best to locate it at some distance from the magnet and coil so as not to have another strong magnetic field near the instrument, or to wind it anti-inductively.

In Figs. 8 and 9, I have illustrated a modified form of the instrument designed to be used as an ammeter or voltmeter. In this case, the bobbin may be composed as before of copper or other conducting metal and is provided with terminals T T'. Around the bobbin is wound a coil, substantially as shown in Fig. 4, which is also provided with terminals N N', and may have included in its circuit the resistance R as already explained. Instead of attaching terminals directly to the copper bobbin, they may be secured to the ends of the coil of heavy wire designed to respond to current variations; but in any case the bobbin of conducting metal should be used. As shown in Fig. 8 the scale S is provided with a double row of graduations, each of which has a pointer upon the index I.

The operation of the device will be readily understood from the preceding description. Upon the passage of current to each coil the oscillating magnet M is deflected and the index moves over the scale, the deflection being proportioned either to current or to potential according to the winding of the coil; at the same time eddy-currents are set up in the copper of the bobbin which serve to "damp" the action of the magnet, thus making it "dead beat."

In the modification shown in Fig. 8 when the current passes from T to T' either through the bobbin or through the heavy coil wound thereon, the magnet is deflected for current; upon a switch being thrown, carrying the current from N to N' through the coil wound for potential, the magnet deflections become proportional to the voltage; in the two cases readings being taken from the scale S or S', according to the indication desired.

In my Patent No. 502,022, dated July 25, 1893, I have shown an ammeter somewhat similar in construction to the meter shown herein; I therefore do not wish to abandon anything shown herein and not claimed, but claim it in that patent.

I am aware of the patent to Madison M. Garver, No. 525,068, dated April 8, 1890, but that patent discloses an astatic combination, while I prefer a single magnet. I therefore do not wish to claim anything shown therein; but

What I claim, and wish to protect by Letters Patent of the United States, is—

1. In an electric measuring instrument, the combination of an oscillating horse-shoe magnet, simple or compound, having its poles closely approximated, and a coil traversed by the current to be measured and having an extended flat portion between the magnetic poles.

2. In an electric measuring instrument, the combination of an oscillating horse-shoe magnet, simple or compound, having its poles closely approximated and a coil traversed by the current to be measured and having a fan shaped winding extended between the poles of the magnet.

3. In an electric measuring instrument, the combination of an oscillating magnet having its poles closely approximated, and a coil wound upon a conducting bobbin and having a flat portion extending between the poles of the magnet, the coil being traversed by the current to be measured.

4. In an electric measuring instrument, the combination of an oscillating horse-shoe magnet having its poles closely approximated with a coil having a fan-shaped winding upon a conducting bobbin extending between the poles of the magnet.

5. In an electric measuring instrument, a metallic bobbin wound with a coil adapted to respond to variations of potential and having a flat portion adapted to extend between the closely approximated poles of an oscillating horse-shoe magnet, the bobbin and the coil being provided with separate terminals whereby the current to be measured may be directed through either at will.

6. In an electric measuring instrument, the combination of a horse-shoe magnet, as M, having its poles closely approximated, as at P, and oscillating about a center, with a coil wound upon a conducting bobbin and having a flat portion, as C, extending between the poles of the magnet, the coil being traversed by the current to be measured; whereby the passage of current in the coil tends to deflect the magnet and the eddy-currents in the bobbin tend to damp its action.

7. In an electric measuring instrument, an oscillating horse-shoe magnet, as M, having its poles closely approximated, as at P, in combination with a coil responding to variations of potential, wound upon a conducting bobbin and having a flat portion, as C, between the poles of the magnet; the coil and the bobbin being provided with separate terminals as T T', N N', adapted to pass a current to be measured through either at will, and the magnet having an index, as I, reciprocating over a double scale, as S S', whereby readings for potential or current may be obtained from one instrument, substantially as described and set forth herein.

In witness whereof I have hereunto set my hand this 28th day of February, 1893.

ELIHU THOMSON.

Witnesses:
JOHN W. GIBBONEY,
BENJAMIN B. HULL.